(12) United States Patent
Garg et al.

(10) Patent No.: US 7,853,992 B2
(45) Date of Patent: Dec. 14, 2010

(54) CONFIGURING SECURITY MECHANISMS UTILIZING A TRUST SYSTEM

(75) Inventors: Neeraj Garg, Redmond, WA (US);
Jason Brewer, Kirkland, WA (US);
Anatoliy Panasyuk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 11/756,310

(22) Filed: May 31, 2007

(65) Prior Publication Data

US 2008/0301779 A1    Dec. 4, 2008

(51) Int. Cl.
*G06F 17/30*    (2006.01)
*G06F 17/00*    (2006.01)
(52) U.S. Cl. .................... 726/4; 726/3; 726/11
(58) Field of Classification Search ............. 726/4, 726/5, 3
See application file for complete search history.

(56) References Cited

U.S. PATENT DOCUMENTS

| | | | |
|---|---|---|---|
| 5,204,961 | A | 4/1993 | Barlow |
| 5,968,176 | A | 10/1999 | Nessett et al. |
| 6,304,974 | B1 | 10/2001 | Samar |
| 6,473,791 | B1 | 10/2002 | Al-Ghosein et al. |
| 6,968,377 | B1 | 11/2005 | Gleichauf et al. |
| 7,069,438 | B2 | 6/2006 | Balabine et al. |
| 7,076,655 | B2 | 7/2006 | Griffin et al. |
| 7,096,498 | B2 | 8/2006 | Judge |
| 7,194,004 | B1 | 3/2007 | Thomsen |
| 2002/0053032 | A1 | 5/2002 | Dowling et al. |
| 2003/0167405 | A1 | 9/2003 | Freund et al. |
| 2004/0210767 | A1 | 10/2004 | Sinclair et al. |
| 2005/0039051 | A1 | 2/2005 | Erofeev |
| 2006/0143699 | A1 | 6/2006 | Nagata et al. |

OTHER PUBLICATIONS

The security of cloud computing system enabled by trusted computing technology; Shen, Zhidong; Tong, Qiang; Signal Processing Systems (ICSPS), 2010 2nd International Conference on vol. 2; Publication Year: 2010 , pp. V2-11-V2-15.*

Towards Self-Manageable Cloud Services; Brandic, I.; Computer Software and Applications Conference, 2009. COMPSAC '09. 33rd Annual IEEE International vol. 2; Publication Year: 2009 , pp. 128-133.*

Cloud Computing: Issues and Challenges; Dillon, T.; Chen Wu; Chang, E.; Advanced Information Networking and Applications (AINA), 2010 24th IEEE International Conference on Publication Year: 2010 , pp. 27-33.*

(Continued)

*Primary Examiner*—David Y Jung
(74) *Attorney, Agent, or Firm*—Lee & Hayes, PLLC (57) ABSTRACT

Implementations of configuring security mechanisms utilizing a trust system are described. In one implementation, a request to communicate is received at a protected device. Before permission to communicate can be granted, a list of trusted devices is accessed. If information, such as an identity or a secret, associated with the device sending the request to communicate correlates to information found on the list of trusted devices, then communication can be allowed. Otherwise, communication between the device and the protected device can be denied.

20 Claims, 7 Drawing Sheets

OTHER PUBLICATIONS

Almenarez, et al., "PTM: A Pervasive Trust Management Model for Dynamic Open Environments", available at least as early as Apr. 12, 2007, at <<http://www.pspt.org/camera-ready/p2-almenarez-ptm.pdf>>, pp. 1-8.

Kagal, et al., "Trust-Based Security in Pervasive Computing Environments", available at least as early as Apr. 12, 2007, at <<http://ebiquity.umbc.edu/_file_directory_/papers/73.pdf>>, Dec. 2001, pp. 2-5.

Saadi, et al., "(Dis)trust Certification Model for Large Access in a Pervasive Environment", available at least as early as Apr. 12, 2007, <<http://liris.cnrs.fr/publis/pdf/Brunie-2005_liris2288.pdf?id=2288>>, Troubador Publishing Ltd, 2005, pp. 289-299.

* cited by examiner

CONFIGURING SECURITY MECHANISMS UTILIZING A TRUST SYSTEM

BACKGROUND

Users of computing-based devices have become accustomed to the benefits of networks, such as the Internet. Without proper security, however, networked devices are susceptible to trespass by entities such as hackers, who often endeavor to misappropriate private information as well as disseminate harmful malicious software ("malware") on networked devices.

One current technique to thwart trespassers involves the use of firewalls. Generally, firewalls attempt to allow devices to receive good communications that exclude commands from trespassers, while rejecting bad communications that potentially include commands from hackers. Unfortunately, however, differentiating good and bad communications is often very difficult, resulting in several inefficiencies.

For example, a typical firewall may perform reasonably well at protecting customers from direct network-level attacks from the Internet, while performing poorly at allowing customers to receive routine traffic from devices on a local network, such as a home network. Moreover, the complexity of firewalls makes them difficult to use, with the skills needed to effectively customize a firewall often outstripping the knowledge of most users.

Consequently, many users become frustrated with firewalls and resort to opening potentially sensitive ports on a firewall, or switching off a firewall entirely, in order to receive routine communications. This vitiates the firewall's effectiveness, and renders the networked device protected by the firewall susceptible to potentially harmful trespass.

SUMMARY

Implementations of configuring security mechanisms utilizing a trust system are described. In one implementation, a request to communicate is received at a protected device. For example, a remote computing-based device can send a request to write to a memory of another computing-based device which a user wishes to defend from trespass or dissemination of malware. Before permission to communicate with the protected device can be granted, a list of trusted devices can be consulted to verify that the remote computing-based device is a trusted device. The list of trusted devices can include identities of trusted devices, and/or secrets, such as passwords or identification numbers, known only to trusted devices. Trusted devices can include, for example, computing-based devices known to not disseminate malware or be manipulated by hackers.

If information, such as an identity and/or a secret, associated with the remote computing-based device sending the request to communicate correlates to information on the list of trusted devices, then the remote computing-based device can be considered to be a trusted device. In such a case, communication between the remote computing-based device and the protected device can be deemed safe, and be allowed. Otherwise, communication between the remote computing-based device and the protected device can be deemed dangerous, and be denied.

This summary is provided to introduce a selection of concepts that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for configuring security mechanisms utilizing a trust system. More particularly, the techniques described herein involve shielding a protected device from unwanted communications originating from various devices through the construction of a system of trust. This can be accomplished by allowing a trusted user to create a cloud, i.e. allowing the trusted user to specify communication relationships between the protected device and one or more devices which may or may not be owned or controlled by the trusted user. The trusted user can include any user who owns, is authorized to use, or has an interest in defending, a protected device from unwanted communication with other devices. Further, communication relationships can include guidelines regarding which devices in a network can communicate with each other, as well as to what extent the devices can communicate.

For example, an attempt to communicate with the protected device can be received, and information associated with a device attempting to communicate with the protected device can be compared against a list of trusted devices created by the trusted user. For instance an identity of the device attempting to communicate with the protected device and/or a secret—such as a password or identifier, known only to trusted devices—presented to the protected device by the device seeking to communication with the protected device can be compared against the list of trusted devices.

If the information associated with the device attempting to communicate with the protected device does not correlate to information on the list of trusted devices, the request to communicate can be denied. Alternately, if the information associated with the device attempting to communicate with the protected device correlates to information on the list of trusted devices, the request to communicate can be allowed.

Moreover, a policy stored in the list of trusted devices can enumerate types of communication which can be allowed between the protected device and devices attempting to communicate with the protected device. For example, some devices may be allowed to read and write information to the protected device, while other devices may be constrained to only reading information from the protected device.

Exemplary Environment

Figure 1:
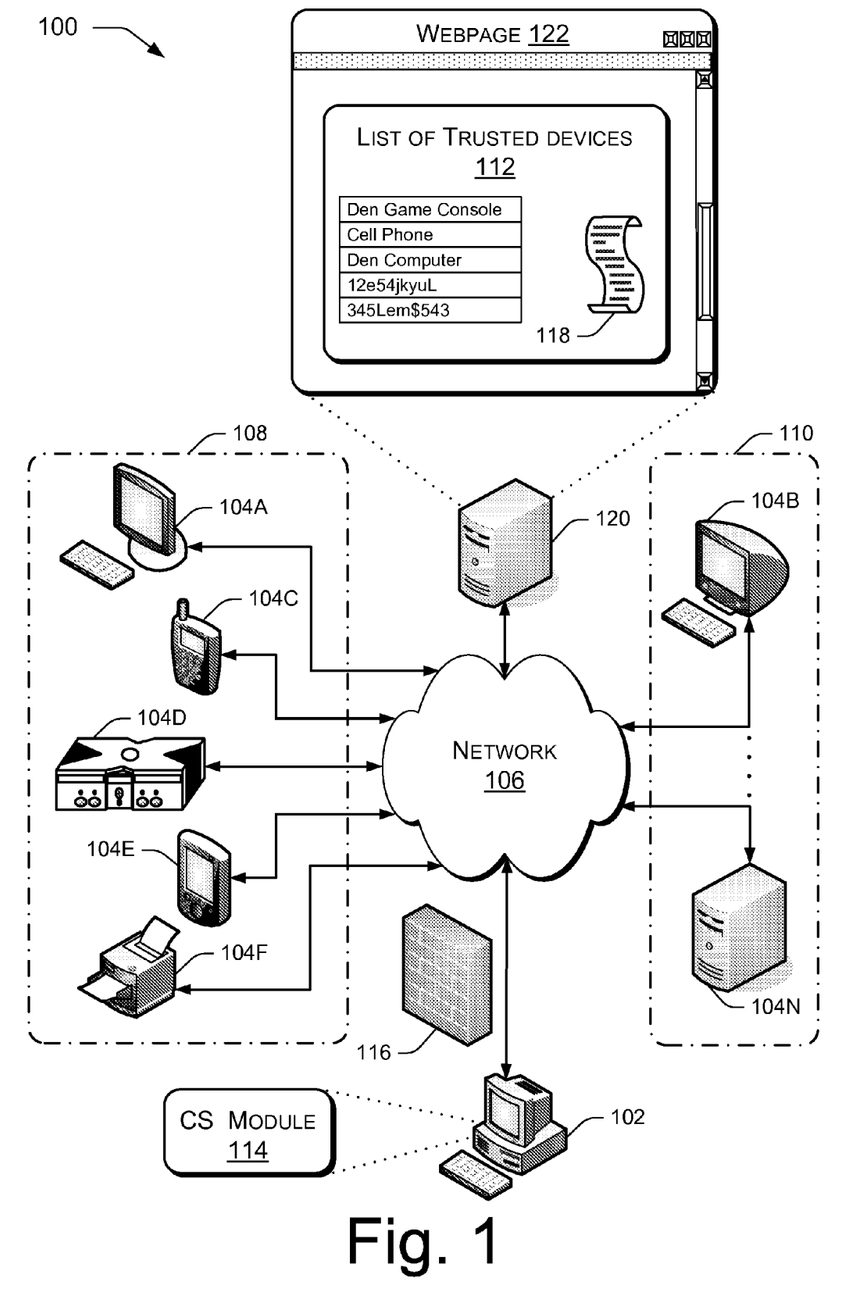
FIG. 1 illustrates an exemplary environment in which configuring security mechanisms utilizing a trust system may be implemented.

FIG. 1 illustrates an exemplary environment 100 in which configuring security mechanisms utilizing a trust system may be implemented. Environment 100 includes a protected device 102 which can be placed in communication with a variety of computing-based devices 104 via a network 106. Protected device 102 can include any computing-based device which a user wishes to protect from unwanted communications, such as trespass by entities including hackers, and transmissions including malware. Protected device 102 can include a server, a game console, a desktop PC, a notebook or portable computer, a workstation, a mainframe computer, an Internet appliance, a mobile phone, a personal digital assistant (PDA), a printer, and so on.

Network 106 can include any wired and/or wireline coupling known in the art capable of placing two or more computing-based devices in electronic communication. Examples of network 106 include a local area network (LAN), a wide area network (WAN), the Internet, a conventional telephone network, a cellular network, any combination thereof, etc.

Devices 104 with which protected device 102 may communicate include any computing-based devices known in the art. For example, devices 104 can include a PC 104A, a PC 104B, a mobile phone 104C, a game console 104D, a personal digital assistant (PDA) 104E, a printer 104F, a server 104N, a network media player, and so on. Devices 104 can be divided into several categories. For example, some devices 104 can be designated as trusted devices 108, while other devices 104 can be designated as untrusted devices 110.

Trusted devices 108 can include devices 104 with which protected device 102 can communicate without assuming an unacceptable level of risk of being exposed to one or more unwanted communications. For example, trusted devices 108 can include devices 104 owned or controlled by a trusted user of protected device 102. Thus, trusted devices 108 can include devices having Internet protocol (IP) addresses (including IPv4, IPv6 and successor protocols) that are part of a set of IP addresses trusted by protected device 102 (such as devices found on a same home or office network as protected device 102). Alternately, trusted devices 108 can include devices 104 associated with entities trusted by the trusted user of protected device 102.

In contrast, untrusted devices 110 can include devices 104 which carry with them an unacceptable risk of promulgating unwanted and/or dangerous communications to protected device 102. For example, untrusted devices 110 can include devices 104 which are neither known nor trusted by the trusted user of protected device 102. For instance, untrusted devices 110 can include devices 104 coupled to protected device 102 via the Internet which are known or suspected to disseminate malware. Alternately, untrusted devices 110 can include devices 104 which are unknown to the trusted user of protected device 102. In yet another possible implementation, untrusted devices 110 can include devices 104 which are known to the trusted user of protected device 102 but which aren't trusted by the trusted user of protected device 102.

Information associated with trusted devices 108 can be placed in a list of trusted devices 112 and be referenced by a communication security (CS) module 114 in protected device 102. The information associated with trusted devices 108 on list of trusted devices 112 can include identities of trusted devices 108, including Internet protocol (IP) addresses (such as IPv4, IPv6 and successor protocols), physical layer addresses, and IP security (Ipsec) information, certificates, etc. Additionally the information associated with trusted devices 108 on list of trusted devices 112 can include information regarding secrets, such as identifiers or passwords, that devices 104 can disclose in order to identify themselves as being trusted devices 108. CS Module 114 can query list of trusted devices 112 for information associated with a device 104 anytime protected device 102 is in a situation in which communication with device 104 is possible.

In one implementation, if protected device 102 receives a request from a device 104 wishing to communicate with protected device 102, CS module 114 can intercept the request and determine if the request originates from a trusted device 108 by looking for information associated with device 104 on list of trusted devices 112. As noted above, this information can include identity information as well as information associated with secrets, such that it can be deduced that device 104 has access to one or more secrets on list of devices 112.

If the information associated with device 104 correlates to information found on list of trusted devices 112, device 104 is a trusted device 108 and CS module 114 can allow communication between device 104 and protected device 102. Alternately, if the information associated with device 104 is not on list of trusted devices 112, device 104 is an untrusted device 108 and CS module 114 can block communication between device 104 and protected device 102. For example, if an identity of device 104 is found on list of trusted devices 112, and/or information associated with device 104 indicates that device 104 has access to one or more secrets on list of trusted device 112, device 104 can be deemed a trusted device 108, and communication with protected device 102 can be allowed by CS module 114.

CS module 114 can work with a firewall 116 associated with protected device 102 to ensure that only trusted devices 108 communicate with protected device 102. Firewall 116 can include any technology known in the art for regulating communications transmitted to and/or from a computing-based device.

CS module 114 can utilize any technique known in the art to ascertain the identity of the device 104 attempting to communicate with protected device 102. Such techniques include, among others, the viewing of Internet protocol (IP) addresses (such as IPv4, IPv6 and successor protocols), physical layer addresses (such as media access control (MAC) addresses), IP security (Ipsec) information, and certificates associated with device 104. Additionally, CS module 114 can view unique codes, such as passwords, to identify devices 104. For example, a device 104 can transmit a unique code which identifies it automatically to CS module 114 as a trusted device 108.

Similarly, CS module 112 can utilize any technique known in the art to determine if device 104 has access to one or more of the secrets on list of trusted devices 112. This can include querying device 104 with prompts to determine if device 104 can provide one or more correct answers based on secret information on list of trusted devices 112.

In one implementation, CS module 112 can require both an identity on list of trusted devices 112 and secret information on list 112 before device 104 can be confirmed as a trusted device 108. Alternately, CS module can require either an identity on list of trusted devices 112 or secret information on list 112 before device 104 can be confirmed as a trusted device 108.

In addition to accessing identities and/or secrets of trusted devices 108 from list of trusted devices 112, CS module 114 can also consult a policy 118 associated with list of trusted devices 112 to see what kinds of communications are allowable between trusted devices 108 and protected device 102. For example, policy 118 can include rules limiting some trusted devices 108 to read only actions with protected device 102. Similarly, policy 118 can include rules affording selected trusted devices 108 broad rights vis-à-vis protected device 102, including rights to write data and/or commands to protected device 102 and rights to change settings on protected device 102.

Moreover, policy 118 can include temporal limits on communications. For example, policy 118 can grant a trusted device 108, such device 104C, a bounded period of time every hour in which to interact with protected device 102. Additionally, policy 118 can be programmed by the trusted user of protected device 102 to allow a device 104 temporary access to protected device 102. For example, the user may desire to allow an untrusted device 110 to download data from protected device 102. In such a case, policy 118 can be amended to allow the untrusted device 110 read only access to protected device 102 for a bounded time limit, such as twenty minutes, or until the information targeted has been successfully downloaded. Afterwards, the untrusted device 110 can be cut off and denied further access to protected device 102.

List of trusted devices 112 can be stored on a trusted server 120 accessible by protected device 102 via network 106. Trusted server 120 can include any computing-based device on which data and/or instructions may be stored, including a server, a desktop PC, a notebook or portable computer, a workstation, a mainframe computer, an Internet appliance, and so on. For example, when a request to communicate is received at protected device 102, CS module 114 can query trusted server 120 to see if the identity of requesting device 104 is on list of trusted devices 112. If the identity of requesting device 104 is on list of trusted devices 112, then CS module 114 can allow requesting device to communicate with protected device 102. Communication can be conducted directly between requesting device 104 and protected device 102, or via trusted server 120.

In another possible implementation, list of trusted devices 112 can be saved on both trusted server 120 and protected device 102. Changes to either copy of list of trusted devices 112 can then be promulgated through both copies by, for example, synchronization. For instance, if a trusted user of protected device 102 amends list of trusted devices 112 on trusted server 120, the amendments can be promulgated to list of trusted devices 112 on protected device 102 during a synchronization of list of trusted devices 122 on trusted server 120 and list of trusted devices 112 on protected device 102. Such synchronization can occur on demand, periodically, or whenever amendments are made to either list of trusted devices 112. Moreover, by storing list of trusted devices 112 locally on protected device 102, list of trusted devices 112 can be accessed by protected device 102 even when communication between protected device 102 and server 120 is not possible.

In yet another possible implementation, list of trusted devices 112 can be stored solely on protected device 102. In such an implementation, the trusted user of protected device 102 can amend list of trusted devices 112 by entering amendments directly into protected device 102.

As shown in FIG. 1, trusted server 120 can host a webpage 122 through which the trusted user of protected device 102 can create and amend list of trusted devices 112. In one implementation, the trusted user of protected device 102 can access list of trusted devices 112 by entering identification information, such as a username and password, via webpage 122. Once granted access, the trusted user of protected device 102 can add or delete devices 104 from list of trusted devices 112. For example, if the trusted user of protected device 102 wants to add a newly purchased printer to a home network (of which protected device 102 is a part) the trusted user of protected device 102 can add the identity of the printer to list of trusted devices 112 through webpage 122. Alternately, in another exemplary situation, the trusted user or protected device 102 may chose to delete a computer, such as PC 104A, from list of trusted devices 112 if the trusted user intends to sell the computer to another user.

In addition to the use of webpage 122, list of trusted devices 112 can be amended through any other technique known in the art. For example, pop up windows may be used. In one possible implementation, if a trusted device 108 is removed from a home or office network, such as network 106, a pop up may be presented to the trusted user of protected device 102 alerting him to the removal and asking if he would like to effect the removal of the trusted device 108 from list of trusted devices 112. In one implementation removal of trusted device 108 from list of trusted devices 112 can entail removing an identity of trusted device from list of trusted devices 112. In another implementation, removal of trusted device 108 from list of trusted devices 112 can entail removal of secret information, such as a password unique to trusted device 108, from list of trusted devices.

If a pop up window is used to effect removal of trusted device 108 from list of trusted devices 112, the pop up window can appear on protected device 102. Alternately, the pop up window can appear on any of trusted devices 108. Moreover, the pop up window can include a field in which the trusted user of protected device 102 can be required to enter authentication information, such as a password, before any changes can be made to list of trusted devices 112.

Similarly, if a device 104 is added to a home or office network, such as network 106, a pop up window may be presented to the trusted user of protected device 102 alerting him to the addition, and asking the trusted user of protected device 102 if he would like to add the device 104 to the list of trusted devices 112. In one possible implementation, the pop up window can appear on protected device 102. Alternately, the pop up window can appear on any of trusted devices 108. As with above, the pop up window can include a field in which the trusted user of protected device 102 can be required to enter authentication information, such as a password before any changes to list of trusted devices 112 can be made.

In yet another possible implementation, list of trusted devices 112 can be updated automatically when a new device 104 is added to a home or office network. This can follow from an assumption that the home and/or office network is under the control of the trusted user of protected device 102, and therefore all devices 104 on the network are trusted devices 108, and their identities and/or secrets which can be referenced to identify devices 104 as trusted devices 108 should be placed on list of trusted devices 112.

In addition to adding, deleting and amending information associated with trusted devices 108 on list of trusted devices 112, the trusted user of protected device 102 can also create and amend policy 118 using the techniques discussed above. For example, if the trusted user frequently lends a cell phone, such as cell phone 104C, to colleagues, the trusted user may not want the colleagues to be able to write information to protected device 102. Therefore the trusted user could amend policy 118 through webpage 122 to preclude communications including write commands from being delivered to protected device 102 from cell phone 104C.

It will also be understood that the techniques described above can be expanded to allow multiple environments, such as environment 100 and similar environments, to communicate with each other. For example, environment 100 can be considered to include a circle of trust (i.e. a collection of trusted devices 108, protected device 102 and trusted server 120 which can all communicate with each other in accordance with rules set out in policy 118). In a similar manner other environments can comprise other circles of trust. Information associated with one or more of these circles of trust can be included in list of trusted devices 112 along with rules in policy 118 specifying what types of communications can be allowed between the one or more circles and the circle of trust in environment 100.

For example, the trusted user of protected device 102 may wish to allow devices in a second circle of trust from an office network to read certain data from devices 104 and or protected device 102 in environment 100. The user can allow this by including information associated with the second circle of trust along with instructions in policy 118 to allow read only operations from devices in the second circle of trust. Policy 118 can also be programmed to allow devices in the second circle of trust to access protected device 102 for a bounded period of time, such as one hour.

Exemplary Peer to Peer Environment

Figure 2:
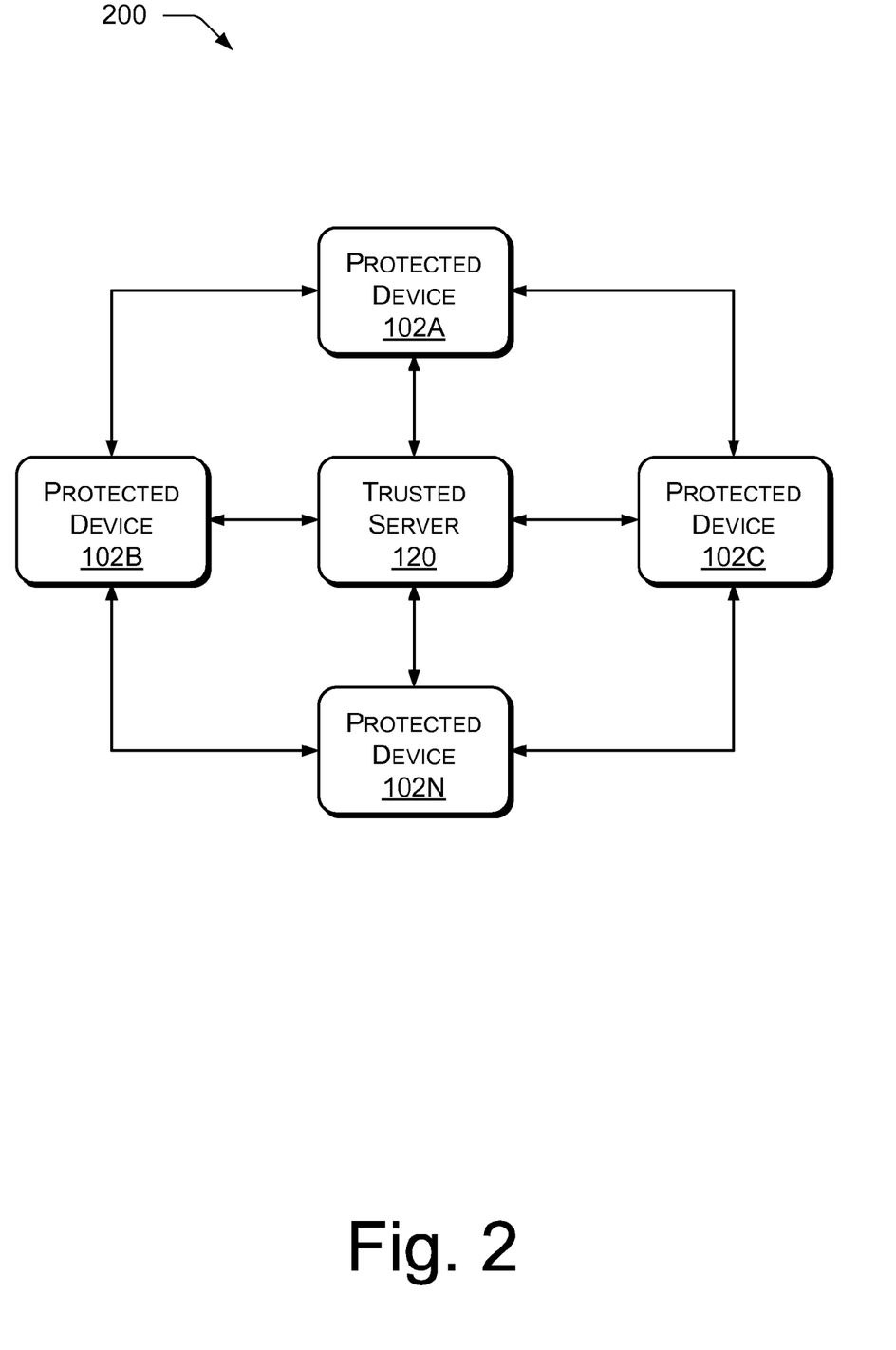
FIG. 2 illustrates an exemplary peer to peer environment in which configuring security mechanisms utilizing a trust system may be implemented.

FIG. 2 shows an exemplary peer to peer environment 200 suitable for implementing configuring security mechanisms utilizing a trust system. Environment 200 includes trusted server 120, and one or more protected devices 102A-N coupled in a peer to peer fashion.

In one exemplary implementation, each of protected devices 102A-N can access list of trusted devices 112 on trusted server 120. In this way, each of protected devices can directly verify if a device 104 attempting to instigate communication is a trusted device 108.

In another possible implementation, one or more of protected devices 102A-N can include a copy of list of trusted devices 112 in addition to list of trusted devices stored on trusted server 120. Amendments to list of trusted devices 112 on any of protected devices 102A-N and/or trusted server 120, can be promulgated throughout environment 200 in a variety of ways.

For example, if list of trusted devices 112 on any of protected devices 102A-N is amended, the amendments can be transmitted to trusted server 120 and be used to update list of trusted devices 112 on trusted server 120. Trusted server 120 can then transmit the updates to list of trusted devices on trusted server 120 to the other protected devices 102A-N in peer to peer environment 200 such that lists of trusted devices 112 on all protected devices 102 A-N are updated.

In another exemplary implementation, an update to a list of trusted devices 112 on any of protected devices 102A-N and/or trusted server 120 can be transmitted directly from the protected device 102A-N or trusted server 120 to any adjacent protected devices 102A-N and/or trusted server 120. For example, if list of trusted devices 112 on protected device 102A is amended, the amendments can be transmitted directly to protected device 102B, protected device 102C, and trusted server 120. One or more of protected device 102B, protected device 102C, and trusted server 120 can then transmit the amendments on to adjacent devices, such as protected device 102N, and so on until all of protected devices 102A-N and trusted server 120 have received the amendments.

Exemplary Protected Device

Figure 3:
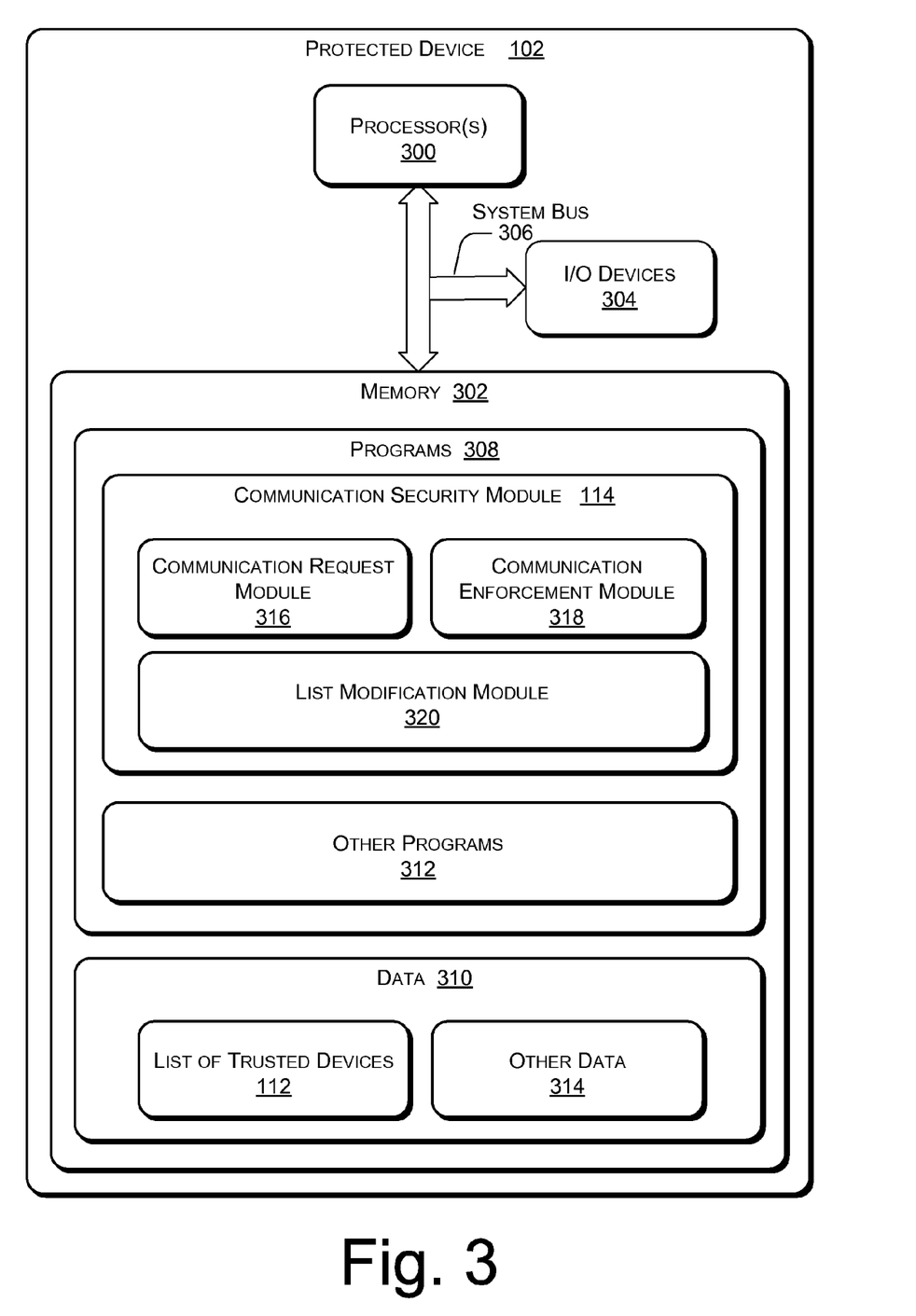
FIG. 3 illustrates an exemplary protected device.

FIG. 3 illustrates various components of protected device 102 according to one embodiment of configuring security mechanisms utilizing a trust system. Protected device 102 can include one or more processor(s) 300, a memory 302, input/output (I/O) devices 304 (e.g., keyboard, display, mouse, touch screen, remote control, motion sensor, bar code reader, buttons, etc.), and a system bus 306 operatively coupling the various components of protected device 102.

System bus 306 represents any of several types of bus structures, including a memory bus or memory controller, a peripheral bus, an accelerated graphics port, and a processor bus or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, and an IEEE 1394 (i.e., FireWire) bus.

Memory 302 can include computer-readable media in the form of volatile memory, such as RAM and/or non-volatile memory, such as ROM, or flash RAM. Memory 302 can also include data and program modules for implementing configuring security mechanisms utilizing a trust system which are immediately accessible to, and presently operated on, by processor(s) 300.

Memory 302 can include programs 308 and data 310. Programs 308 can include communication security (CS) module 114 as well as other programs 312, including file sharing applications, web browsing applications, word processing applications, spreadsheet applications, etc. Data 310 can include list of trusted devices 112 and other data 314, such as data associated with a general functioning of one or more programs—such as CS module 114 and other programs(s) 312.

CS module 114 includes a communication request module 316, a communication enforcement module 318, and a list modification module 320. In operation, communication request module 316 can receive a request from a requesting device 104 to communicate with protected device 102. Communication request module 316 can transmit the request to communication enforcement module 318, where information associated with requesting device 104, such as an identity of requesting device 104 and/or information relating to access to secrets on list of trusted devices 112 by requesting device 104, can be ascertained.

For example, communication enforcement module 318 can parse the request from requesting device 104 for information such as an Internet protocol (IP) address (including IPv4, IPv6 and successor protocols), a physical layer address (such as a media access control (MAC) address), IP security (Ipsec) information, and a certificate associated with requesting device 104. Alternately, communication enforcement module 318 can parse the request for a unique code, such as a password, that identifies requesting device 104. Still further, communication enforcement module 318 can parse the request for secret information, such as a password or identifier, indicating that requesting device 104 has access to one or more secrets in list of trusted devices 112.

Once the information associated with requesting device 104 is ascertained, communication enforcement module 318 can determine if requesting device 104 is a trusted device 108 by looking for information associated with requesting device 104 on list of trusted devices 112. If the information associated with requesting device 104 is on list of trusted devices 112, requesting device 104 is a trusted device 108 and communication enforcement module 318 can allow communication between requesting device 104 and protected device 102. Moreover, if desired, communication enforcement module 318 can promote secure communication between requesting device 104 and protected device 102 through employment of encryption and/or or use of secure communication technologies compatible with both requesting device 104 and protected device 102.

In one implementation, communication enforcement module 318 can effect a reconfiguration of firewall 116 associated with protected device 102 to ensure that only trusted devices 108 communicate with protected device 102. Firewall 116 can include any technology known in the art for regulating communications transmitted to and/or from a computing-based device.

In addition to reviewing list of trusted devices 112 to determine if requesting device 104 is a trusted device 108, communication enforcement module 318 can also consult policy 118 associated with list of trusted devices 112 to see what kinds of communications are allowable between trusted devices 108 and protected device 102.

As noted in the discussion associated with FIG. 1 above, policy 118 can include a variety of rules defining allowable communications between protected device 102 and each trusted device 108. Moreover, policy 118 can include temporal limits on communications, and policy 118 can be programmed by the trusted user of protected device 102 to allow a device 104 temporary access to protected device 102.

List modification module 320 can enable a trusted user of protected device 102 to add information and/or otherwise amend list of trusted devices 112, including policy 118. For example, the trusted user of protected device 102 can indicate a desire to amend list of trusted devices 112 by selecting an icon or by interacting with any other user interface known in the art. For example, a user can navigate to webpage 122 and interact with the fields thereon, as discussed above. In one implementation, list modification module 320 can require the trusted user of protected device 102 to provide identification information, such as a password, before allowing the trusted user of protected device 102 to make any changes to list of trusted devices 112.

List modification module 320 can present the trusted user of protected device 102 with a display of list of trusted devices 112, which the trusted user of device 102 can amend as desired. For example, identities and/or secrets associated with trusted devices 108 can be added or subtracted from list of trusted devices 112. Moreover, policies associated with trusted devices 108 on list of trusted devices 112 can be changed. In one implementation, list modification module 320 can make changes to list of trusted devices 112 stored on protected device 102. In another possible implementation, list modification module 320 can make changes to list of trusted devices 112 stored on trusted server 120.

List modification module 320 can also allow the trusted user of protected device 120 to amend list of trusted devices 112 by presenting the trusted user of protected device 102 with pop up windows. For example, if a trusted device 108 is removed from a home or office network, such as network 106, list modification module 320 can present a pop up to the trusted user of protected device 102 alerting them to the removal and asking them if they would like to remove the trusted device 108 from list of trusted devices 112.

In one possible implementation, the pop up window can appear on protected device 102. Alternately, the pop up window can appear on any of trusted devices 108. Moreover, the pop up window can include a field in which the trusted user of protected device 102 can be required to enter authentication information, such as a password before any changes can be made to list of trusted devices 112.

Similarly, if a device 104 is added to a home or office network, such as network 106, list modification module 320 may present a pop up to the trusted user of protected device 102 alerting him to the addition, and asking the trusted user of protected device 102 if he would like to add the device 104 to the list of trusted devices 112. In one possible implementation, the pop up window can appear on protected device 102. Alternately, the pop up window can appear on any of trusted devices 108. As with above, the pop up window can include a field in which the trusted user of protected device 102 can be required to enter authentication information, such as a password, before any changes can be made to list of trusted devices 112.

In yet another possible implementation, list modification module 320 can automatically update list of trusted devices 112 with the identities and/or associated secrets of new devices 104 added to a home or office network. This can follow from an assumption that the home and/or office network is under the control of the trusted user of protected device 102, and therefore all devices 104 on the network are trusted devices 108, and their associated information can be placed on list of trusted devices 112.

Regardless of which list of trusted devices 112 (i.e. list of trusted devices 112 on protected device 102 or list of trusted devices on trusted server 120) is changed by list modification module 320, the changes can be promulgated by list modification module 320 to any other existing copies of list of trusted devices 112 through, for example, synchronization. For instance, if the list modification module 320 amends list of trusted devices 112 on trusted server 120, the amendments made can be promulgated by list modification module 320 to list of trusted devices 112 on protected device 102 during a synchronization of list of trusted devices 122 on trusted server 120 and list of trusted devices 112 on protected device 102. Similarly, if the list modification module 320 amends list of trusted devices 112 on protected device 102, the amendments made can be promulgated by list modification module 320 to list of trusted devices 112 on trusted server 102 during a synchronization of list of trusted devices 122 on protected device 102 and list of trusted devices 112 on trusted server 120. Such synchronization can occur on demand, periodically, or whenever amendments are made to either list of trusted devices 112.

Exemplary Trusted Server

Figure 4:
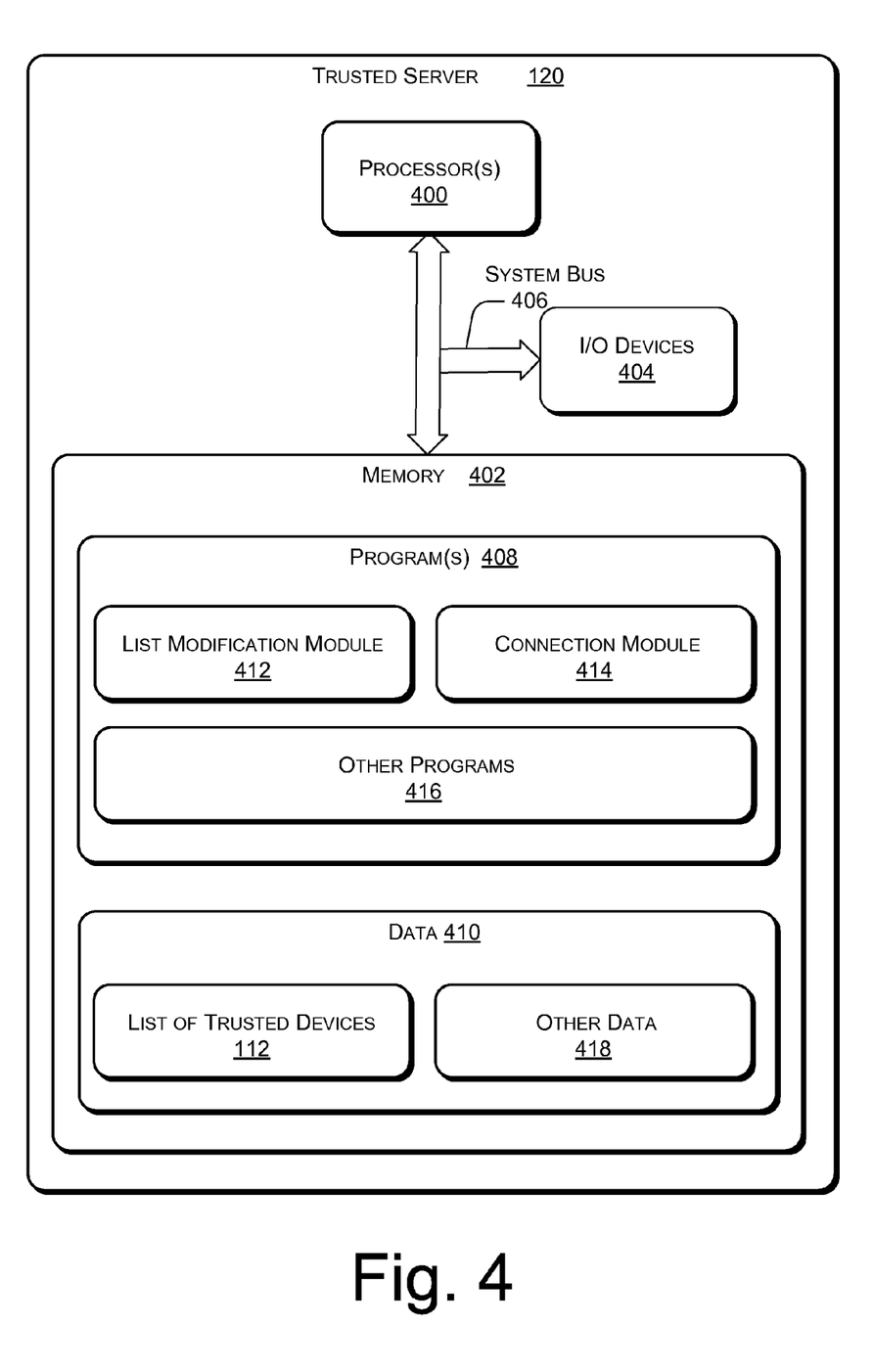
FIG. 4 illustrates an exemplary trusted server.

FIG. 4 illustrates various components of trusted server 120 in accordance with one embodiment of configuring security mechanisms utilizing a trust system. Trusted server 120 can include one or more processor(s) 400, a memory 402, input/output (I/O) devices 404 (e.g., keyboard, display, and mouse), and a system bus 406 operatively coupling the various components of trusted server 120.

System bus 406 represents any of several types of bus structures, including a memory bus or memory controller, a peripheral bus, an accelerated graphics port, and a processor bus or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, and an IEEE 1394 (i.e., FireWire) bus.

Memory 402 can include computer-readable media in the form of volatile memory, such as RAM and/or non-volatile memory, such as ROM, or flash RAM. Memory 402 can also include data and program modules for implementing configuring security mechanisms utilizing a trust system which are immediately accessible to, and presently operated on, by processor(s) 400.

Memory 402 can include programs 408 and data 410. Programs 408 can include list modification module 412, connection module 414, and other programs 416 such as file sharing applications, web browsing applications, word processing applications, spreadsheet applications, etc. Data 410 can include list of trusted devices 112 and other data 418, such as data associated with a general functioning of one or more programs—such as list modification module 412, connection module 414 and other programs(s) 312.

List modification module 412 can allow for the amendment of list of trusted devices 112. In one implementation, as discussed above, list modification module 412 can allow a trusted user of protected device 102 to amend list of trusted devices 112 through webpage 122. In another possible implementation, also discussed above, list modification module 412 can allow a trusted user of protected device 102 to amend list of trusted devices 112 through pop up windows.

In yet another implementation, list modification module 412 can function in conjunction with and/or be manipulated by communication enforcement module 318 to modify list of trusted devices 112. For example, if a trusted user of protected device 102 amends list of trusted devices 112 residing on protected device 102, a component on protected device 102, such as communication enforcement module 318, can direct list modification module 412 to synchronize list of trusted devices 112 residing on trusted server 120 with list of trusted devices 112 residing on protected device 102.

Connection module 414 can enable trusted devices 108 to communicate with protected device 102 through trusted server 102. For example, a device 104 may attempt to communicate with protected device 102 and be identified as a trusted device 108 by communication enforcement module 318. At which point, communication enforcement module 318 may direct connection module 441 to facilitate communication between protected device 102 and trusted device 108 through trusted server 120. In this way, connection module 414 can facilitate secure communication of data and commands between trusted server 120 and protected device 102.

Exemplary Methods

Figure 5:
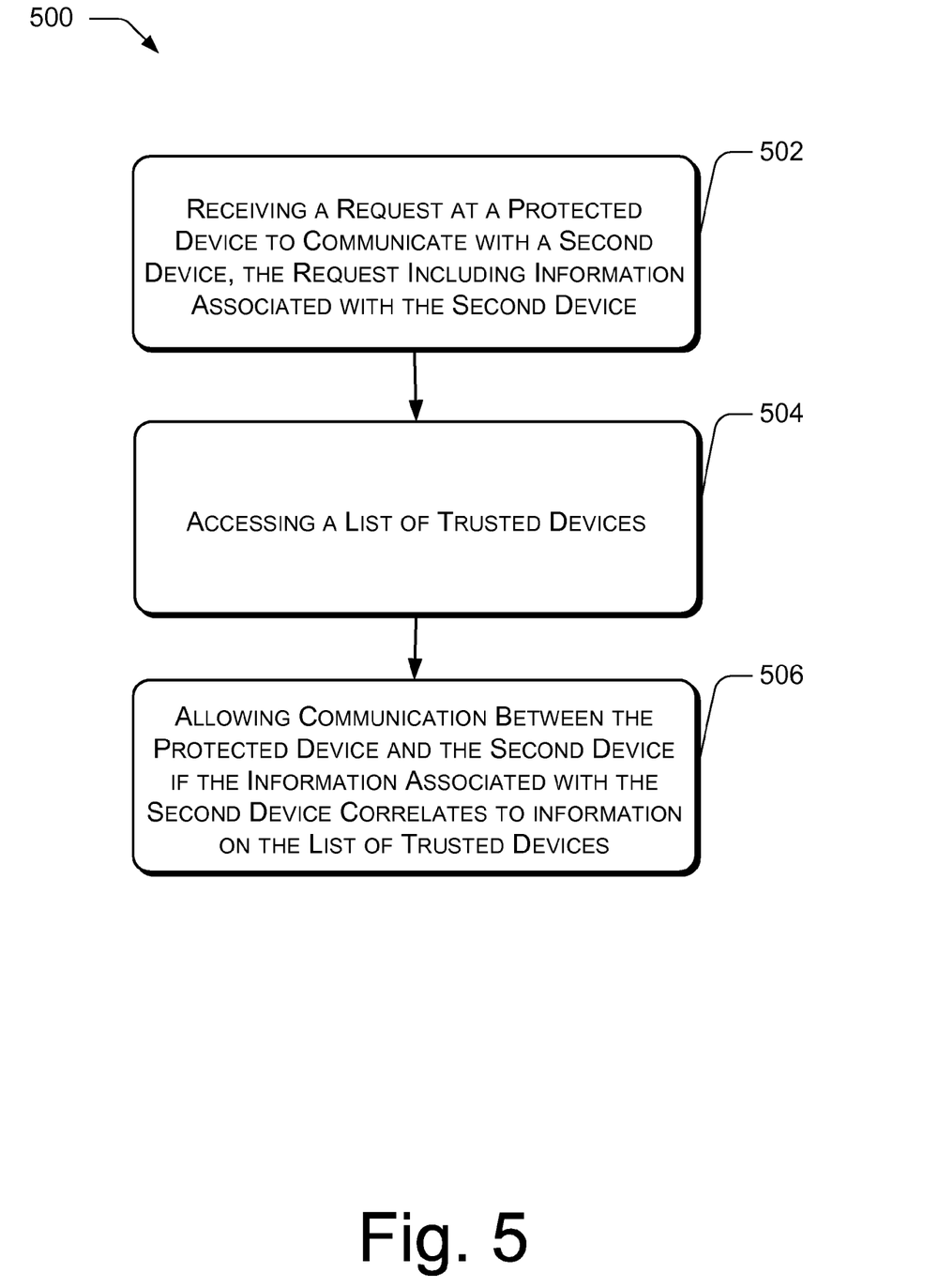
FIG. 5 illustrates an exemplary process for configuring security mechanisms utilizing a trust system.
Figure 6:
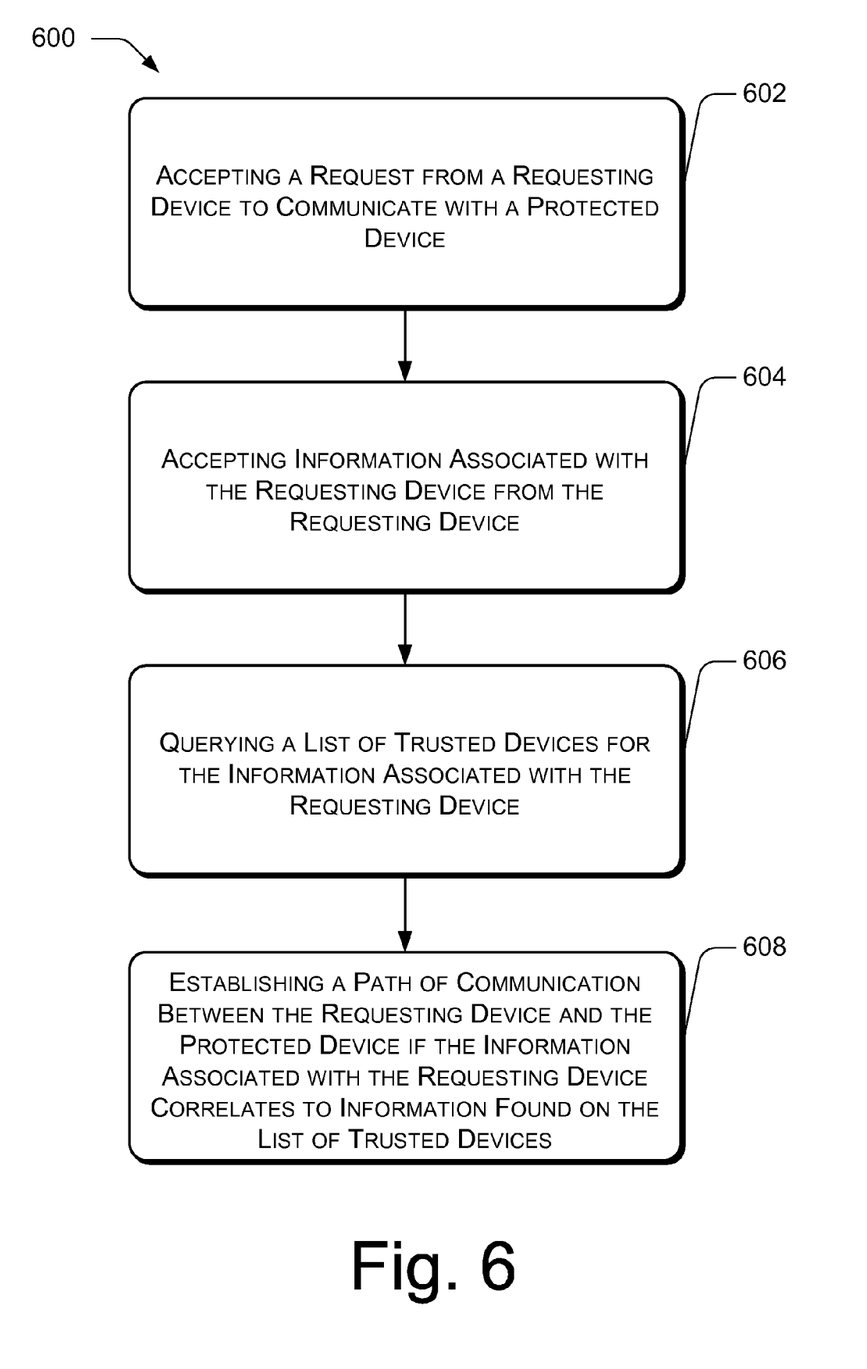
FIG. 6 illustrates another exemplary process for configuring security mechanisms utilizing a trust system.
Figure 7:
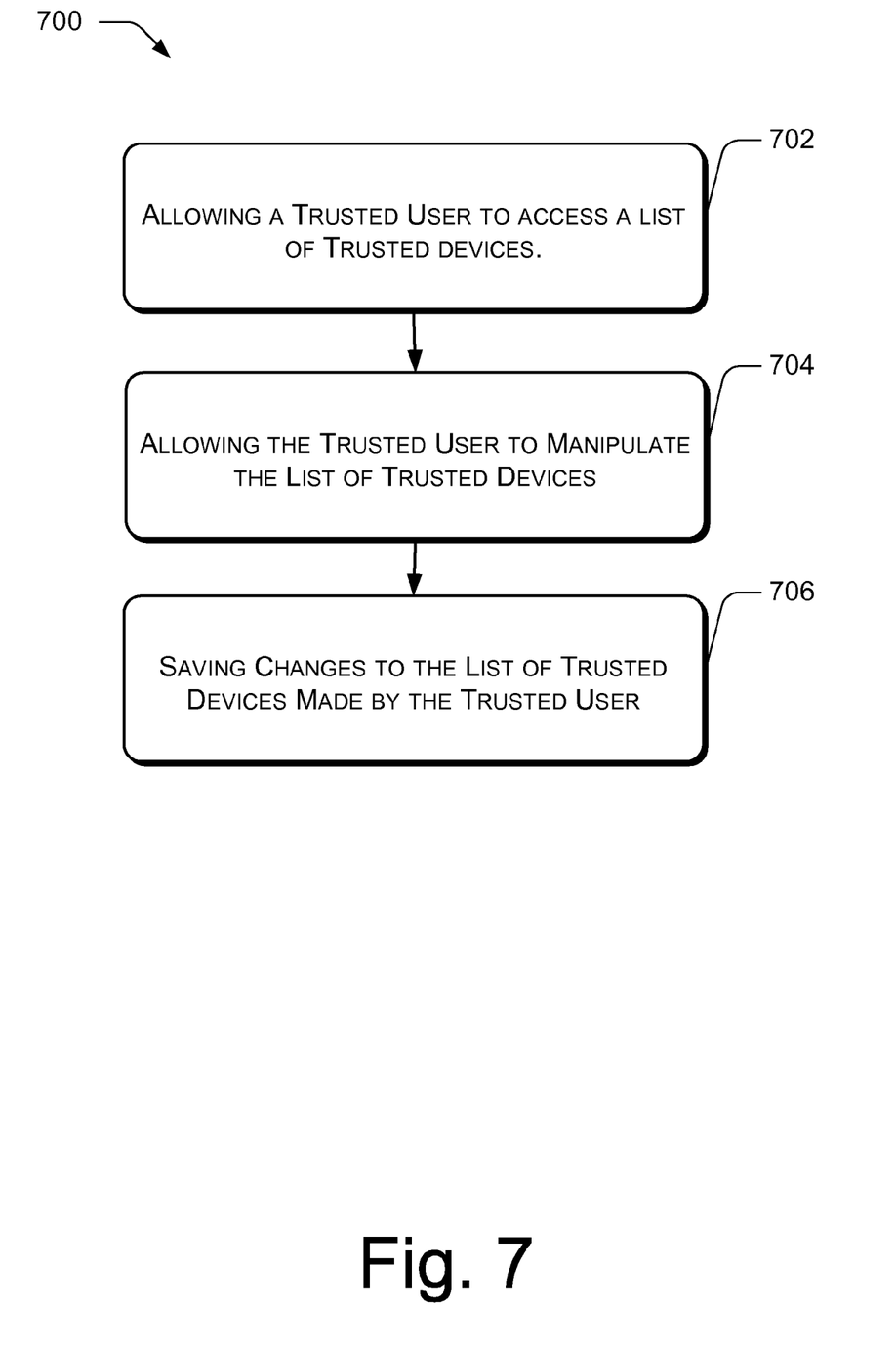
FIG. 7 illustrates an exemplary process for updating a list of trusted devices.

FIGS. 5-7 illustrate exemplary methods for implementing aspects of configuring security mechanisms utilizing a trust system. The methods are illustrated as a collection of blocks in a logical flow graph representing a sequence of operations that can be implemented in hardware, software, firmware or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may be described with reference to elements shown in FIGS. 1-4.

Exemplary Method I

FIG. 5 illustrates an exemplary method 500 for configuring security mechanisms utilizing a trust system. At block 502, a request to communicate is received at a protected device, such as protected device 102. The attempt can originate from a second device, such as a device 104A-N, and include information associated with the second device. The information can come in many forms, including an identity such as an Internet protocol (IP) address (including IPv4, IPv6, and successor protocols), a physical layer address (such as a media access control (MAC) address), IP security (Ipsec) information, and a certificate associated with the second device. Additionally, the information can include information, such as identifiers and passwords, which demonstrate that the second device has access to one or more secrets on a list of trusted devices, such as list of trusted devices 112.

At block 504 a list of trusted devices, such as list of trusted devices 112, is accessed. The list of trusted devices can include identities of trusted devices, such as trusted devices 108, with which the protected device can communicate without assuming an unacceptable level of risk of being exposed to one or more unwanted communications. For example, trusted devices on the list of trusted devices can include devices owned or controlled by a same trusted user of the protected device. For instance, the trusted devices can be devices found on a same home or office network as the protected device. Additionally, the trusted devices on the list of trusted devices can include devices associated with entities trusted by the trusted user of the protected device.

In addition to having information associated with trusted devices, the list of trusted devices can also include a policy, such as policy 118. The policy can include a variety of rules defining allowable communications between the protected device and each trusted device on the list of trusted devices. For example, the policy can include rules limiting some trusted devices to read only actions with the protected device, and rules affording other trusted devices broader rights, such as rights to write data and commands, and/or change settings on the protected device. The policy can also include temporal limits on communications between the trusted devices and the protected device. Further, the policy can be programmed to allow a device temporary access to the protected device 102.

The list of trusted devices can reside on the protected device and/or a remote device, such as trusted server 120, to which the protected device is electrically coupled. In one implementation a communication enforcement module, such as communication enforcement module 318, accesses the list of trusted devices wherever the list of trusted devices resides.

At block 506, communication is allowed between the second device and the protected device if the information associated with the second device correlates to information on the list of trusted devices. For example, correlation can occur if the information associated with the second device includes an identity of the second device which is found on the list of trusted devices. Similarly, correlation can occur if the information associated with the second device includes indications that the second device has access to one or more secrets found on the list of trusted devices.

Communication can proceed directly between the second device and the protected device, or communication can be channeled through the remote device. Moreover, if desired, communication can be conducted using any security measures known in the art, including encryption. Additionally, the types of communication between the second device and the protected device can be restricted based on the policy (if any) found in the list of trusted devices.

Exemplary Method II

FIG. 6 illustrates another exemplary method 600 for configuring security mechanisms utilizing a trust system. At block 602, a request to communicate from a requesting device, such as device 104A-N, is accepted at a protected device, such as protected device 102.

At block 604, information associated with the requesting device is accepted from the requesting device. The information associated with the requesting device can come in the form of an identity of the requesting device, including an Internet protocol (IP) address, a physical layer address, IP security (Ipsec) information, and a certificate associated with the requesting device. Additionally, the information associated with the requesting device can come in the form of information, such as identifiers and passwords, demonstrating that that the requesting device has access to one or more secrets on a list of trusted devices, such as list of trusted devices 112.

In one implementation, the request to communicate includes information associated with the requesting device. In another implementation, the protected device queries the requesting device for information associated with the requesting device. For example, the protected device can query the requesting device for identity information and/or information indicative of the requesting device's access to secrets on the list of trusted devices.

At block 606, a list of trusted devices, such as list of trusted devices 112, is queried for information associated with the requesting device. The list of trusted devices includes information associated with trusted devices, such as trusted devices 108, with which the protected device can communicate without assuming an unacceptable level of risk of being exposed to one or more unwanted communications. The list of trusted devices can also include a policy, such as policy 118, including a variety of rules defining allowable communications between the protected device and each trusted device in the list of trusted devices.

The list of trusted devices can reside on the protected device and/or a remote device, such as trusted server 120, to which the protected device is electrically coupled. In one implementation a communication enforcement module, such as communication enforcement module 318, accesses the list of trusted devices wherever the list of trusted devices resides.

At block 608, a path of communication between the requesting device and the protected device is established if the information associated with the requesting device correlates to information found on the list of trusted devices. For example, correlation can occur if the information associated with the requesting device includes an identity of the requesting device which is found on the list of trusted devices. Similarly, correlation can occur if the information associated with the requesting device includes indications that the requesting device has access to one or more secrets found on the list of trusted devices.

The path of communication can be established directly between the requesting device and the protected device, or the path of communication can be channeled through the remote device.

Exemplary Method III

FIG. 7 illustrates an exemplary process 700 for updating a list of trusted devices. At block 702, a trusted user is allowed to access a list of trusted devices, such as list of trusted devices 112. The trusted user can include any user who owns, is authorized to use, or has an interest in defending, a protected device, such as protected device 102, from unwanted communication with other devices. The protected device relies on the list of trusted devices to provide information associated with devices with which the protected device can communicate with an acceptable level of risk.

In one implementation, the trusted user can indicate a desire to amend the list of trusted devices by selecting an icon or by interacting with any other user interface known in the art. For example, the trusted user can be provided with a webpage, such as webpage 122, on which the trusted user can identify himself before being granted access to the list of trusted devices. For example, the trusted user can enter a password.

In another implementation, a modification module, such as list modification module 320 or list modification module 412, can present the trusted user with a pop up window. For example, if a trusted device, such as trusted device 108, is removed or added to a home or office network, such as network 106, the list modification module can present a pop up window to the trusted user alerting him to the removal/addition and asking him if he would like to remove/add information associated with the trusted device to the list of trusted devices. The pop up window can include a field in which the trusted user can be required to enter authentication information, such as a password before any changes can be made to the list of trusted devices.

At block 704, the trusted user can be allowed to manipulate the list of trusted devices. In one implementation, the user can interact with the list of trusted devices displayed to the trusted user in block 702. For example, the trusted user can add or subtract information associated with trusted devices on the list of trusted devices as desired. Further, the trusted user can alter any and all policies, such as policy 118, associated with the trusted devices on the list of trusted devices.

At block 706, the changes made by the trusted user are saved to the list of trusted devices. For example, the changes can be saved to a list of trusted devices residing on a protected device, such as protected device 102, with which the trusted user is associated. Alternately, the changes can be saved to a list of trusted devices on a trusted server, such as trusted server 120, with which the trusted device can communicate. If multiple copies of the list of trusted devices exist, the amendments made by the trusted user can be promulgated to each copy. In one implementation this can occur through synchronization of an amended list of trusted devices with one or more copies of the list of trusted devices.

Conclusion

Although embodiments of configuring security mechanisms utilizing a trust system have been described in language specific to structural features and/or methods, it is to be understood that the subject of the appended claims is not necessarily limited to the specific features or methods described. Rather, the specific features and methods are disclosed as exemplary implementations of configuring security mechanisms utilizing a trust system.

What is claimed is:

1. A method comprising:
   receiving a request at a protected device to communicate with a second device, the request including information associated with the second device;
   accessing a list of trusted devices residing in a location in memory on the protected device;

synchronizing the list of trusted devices with a second list of trusted devices residing on a remote device that is different than the second device; and allowing communication between the protected device and the second device if the information associated with the second device correlates to information on the list of trusted devices, wherein the devices are part of a single cloud computing system.

2. A method as recited in claim 1, wherein receiving includes receiving an identity of the second device via one or more of:
- a certificate;
- a physical layer address;
- an Internet protocol (IP) address;
- an IP security (IPsec) designation.

3. A method as recited in claim 1, wherein receiving includes receiving information indicating that the second device has access to one or more secrets on the list of trusted devices.

4. A method as recited in claim 1, wherein allowing includes enabling one or more types of communication between the protected device and the second device consistent with a policy associated with the list of trusted devices.

5. A method as recited in claim 4, wherein the policy includes temporal limits on communication between the protected device and the second device.

6. A method as recited in claim 1, wherein allowing includes enabling a most secure form of communication as is possible between the protected device and the second device.

7. A method as recited in claim 1, further comprising updating the list of trusted devices by allowing a trusted user to access and amend the list of trusted devices through one or more of:
- a webpage; or
- a pop up window.

8. A computer-readable medium having a set of computer-readable instructions residing thereon that, when executed, perform acts comprising:
- accepting a request from a requesting device to communicate with a protected device;
- accepting information associated with the requesting device from the requesting device;
- querying a list of trusted devices for the information associated with the requesting device;
- establishing a path of communication between the requesting device and the protected device if the information associated with the requesting device correlates to information on the list of trusted devices; and
- updating the list of trusted devices by synchronizing the list of trusted devices with a second list of trusted devices residing on a remote device that is different than the requesting device, wherein the devices are part of a single cloud computing system.

9. A computer-readable medium as recited in claim 8 having a set of computer-readable instructions that, when executed, perform acts further comprising restricting communication between the requesting device and the protected device to one or more types of communication found in a policy associated with the list of trusted devices.

10. A computer-readable medium as recited in claim 9, wherein the policy includes temporal restrictions on communication between the protected device and the second device.

11. A computer-readable medium as recited in claim 8 having a set of computer-readable instructions that, when executed, perform acts further comprising configuring a firewall associated with the protected device to allow communication between the requesting device and the protected device if the information associated with the requesting device correlates to information on the list of trusted devices.

12. A computer-readable medium as recited in claim 8 having a set of computer-readable instructions that, when executed, perform acts further comprising routing the path of communication between the requesting device and the protected device through a trusted server.

13. A computer-readable medium as recited in claim 8, wherein if the information associated with the requesting device does not correlate to information on the list of trusted devices, implementing a policy that allows the requesting device to download read only data from the protected device during a bounded time limit.

14. A computer-readable medium as recited in claim 8, further comprising:
- allowing a trusted user to modify the list of trusted devices; and
- saving the modifications to the list of trusted devices.

15. A computing-based device comprising:
- a processor;
- a memory including a communication security module, the communication security module comprising:
  - a communication request module configured to receive a request from a requesting device to communicate with the computing-based device, the requesting device having associated information;
  - a communication enforcement module configured to access a list of trusted devices and allow communication between the computing-based device and the requesting device if the associated information correlates to information on the list of trusted devices, wherein the communication enforcement module is further configured to synchronize the list of trusted devices stored in the memory with a second list of trusted devices stored on a trusted server remote from the computing-based device, and wherein the devices are part of a single cloud computing system.

16. A computing-based device as recited in claim 15, wherein the associated information includes:
- an identity of the computing-based device; and
- a secret.

17. A computing-based device as recited in claim 15, wherein the communication enforcement module is further configured to implement a most secure method of communication possible between the requesting device and the computing-based device if the associated information correlates to information on the list of trusted devices.

18. A computing-based device as recited in claim 15, wherein the communication enforcement module is further configured to configure a firewall associated with the computing-based device to allow communication between the requesting device and the computing-based device if the associated information correlates to information on the list of trusted devices.

19. A computing-based device as recited in claim 15, further comprising a list modification module configured to allow a trusted user to modify the list of trusted devices.

20. A computing-based device as recited in claim 15, wherein allowing includes enabling one or more types of communication between the computing-based device and the requesting device that is consistent with a policy associated with the list of trusted devices, wherein the policy includes temporal limits on the one or more types of communication between the computing-based device and the requesting device.

* * * * *